(12) United States Patent
Banerjee et al.

(10) Patent No.: US 11,567,775 B1
(45) Date of Patent: Jan. 31, 2023

(54) DYNAMIC GENERATION OF LOGIC FOR COMPUTING SYSTEMS

(71) Applicant: SAP SE, Walldorf (DE)

(72) Inventors: Debashis Banerjee, Bengaluru (IN); Paresh Rathod, Pune (IN); Kavitha Krishnan, Bangalore (IN); Prateek Agarwal, Pune (IN); Hemanth Basrur, Bangalore (IN)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 17/510,100

(22) Filed: Oct. 25, 2021

(51) Int. Cl.
    *G06F 9/30* (2018.01)
    *G06F 9/38* (2018.01)
    *G06F 9/455* (2018.01)
    *G06N 20/00* (2019.01)

(52) U.S. Cl.
    CPC ........ *G06F 9/30181* (2013.01); *G06F 9/3808* (2013.01); *G06F 9/45516* (2013.01); *G06N 20/00* (2019.01)

(58) Field of Classification Search
    CPC ............... G06F 9/30181; G06F 9/3808; G06F 9/45516; G06N 20/00
    See application file for complete search history.

(56) References Cited

U.S. PATENT DOCUMENTS

| | | | | |
|---|---|---|---|---|
| 6,058,402 A | * | 5/2000 | Feiken | G07F 7/1008 708/145 |
| 6,453,407 B1 | * | 9/2002 | Lavi | G06F 9/30174 712/E9.035 |
| 2007/0074007 A1 | * | 3/2007 | Topham | G06F 9/3875 712/E9.034 |
| 2015/0286484 A1 | * | 10/2015 | Wiencke | G06F 9/30054 712/214 |
| 2016/0019036 A1 | * | 1/2016 | Bar-Or | G06F 8/66 717/159 |
| 2018/0101384 A1 | * | 4/2018 | Keaveny | G06F 9/3016 |
| 2018/0349158 A1 | * | 12/2018 | Swersky | G06N 3/0472 |
| 2021/0124565 A1 | * | 4/2021 | Farivar | G06F 9/45516 |

* cited by examiner

*Primary Examiner* — Corey S Faherty
(74) *Attorney, Agent, or Firm* — Fountainhead Law Group P.C.

(57) ABSTRACT

Some embodiments provide a non-transitory machine-readable medium that stores a program. The program observes a parameter associated with a computing system. Upon receiving a change associated with the parameter, the program further determines a routine definition from a set of routine definitions associated with the parameter. Each routine definition in the set of routine definitions specifies a set of instructions associated with a particular parameter associated with the computing system. The program also executes the set of instructions specified in the determined routine definition.

20 Claims, 11 Drawing Sheets

Create Line Item Form

Name: Handle ~605
Description: Exterior handle for car door ~610
Commodities: 90% iron and 10% nickel ~615
Currency: USD ~620

Line Item Attributes

625 ⌇ ☒ Price
630 ⌇ ☒ Quantity
635 ⌇ ☐ Extended Price

640 ⌇ Create Form

FIG. 6

Line Item Form

| Name | Price | Iron Stock Price | Nickel Stock Price | Quantity |
|---|---|---|---|---|
| Handle ~805 | USD ~810 | 52 ~815 | 19 ~820 | each ~825 |

Save Form ~830

DYNAMIC GENERATION OF LOGIC FOR COMPUTING SYSTEMS

BACKGROUND

Software applications are programs that operate on computing devices and/or systems. These applications are configured to perform a set of specific tasks. Typically, software applications are to be used by end-users. Examples of software applications include word processors, media editors, media players, database applications, spreadsheet applications, presentation applications, etc. In general, software applications are developed with predefined functionality. To add, modify, and/or remove features to software applications, their code is edited and recompiled. Then, the software application is redeployed on a computing device.

SUMMARY

In some embodiments, a non-transitory machine-readable medium stores a program executable by at least one processing unit of a device. The program observes a parameter associated with a computing system. Upon receiving a change associated with the parameter, the program further determines a routine definition from a set of routine definitions associated with the parameter. Each routine definition in the set of routine definitions specifies a set of instructions associated with a particular parameter associated with the computing system. The program also executes the set of instructions specified in the determined routine definition.

In some embodiments, the program may further use a machine learning model to predict a value based on the received change associated with the parameter and adjust the set of instructions based on the value. Executing the set of instructions may include executing the adjusted set of instructions. The computing system may be configured to generate log data. Observing the parameter associated with the computing system may include reading information from the log data.

In some embodiments, the parameter associated with the computing system may be an attribute. The change associated with the parameter may include selection of the attribute to be included in a form generated by the computing system. The parameter associated with the computing system may be utilization of a configuration parameter of the computing system. The change associated with the parameter may include a value for the configuration parameter passed a defined threshold value. The program may further determine whether the set of instructions specified in the determined routing definition are valid by parsing the set of instructions into a set of tokens and determining that a particular token in the set of tokens matches a word in a set of defined valid words.

In some embodiments, a method, executable by a device, observes a parameter associated with a computing system. Upon receiving a change associated with the parameter, the method further determines a routine definition from a set of routine definitions associated with the parameter. Each routine definition in the set of routine definitions specifies a set of instructions associated with a particular parameter associated with the computing system. The method also executes the set of instructions specified in the determined routine definition.

In some embodiments, the method may further use a machine learning model to predict a value based on the received change associated with the parameter and adjust the set of instructions based on the value. Executing the set of instructions may include executing the adjusted set of instructions. The computing system may be configured to generate log data. Observing the parameter associated with the computing system may include reading information from the log data.

In some embodiments, the parameter associated with the computing system may be an attribute. The change associated with the parameter may include selection of the attribute to be included in a form generated by the computing system. The parameter associated with the computing system may be utilization of a configuration parameter of the computing system. The change associated with the parameter may include a value for the configuration parameter passed a defined threshold value. The program may further determine whether the set of instructions specified in the determined routing definition are valid by parsing the set of instructions into a set of tokens and determining that a particular token in the set of tokens matches a word in a set of defined valid words.

In some embodiments, a system includes a set of processing units and a non-transitory machine-readable medium that stores instructions. The instructions cause at least one processing unit to observe a parameter associated with a computing system. Upon receiving a change associated with the parameter, the instructions further cause the at least one processing unit to determine a routine definition from a set of routine definitions associated with the parameter. Each routine definition in the set of routine definitions specifies a set of instructions associated with a particular parameter associated with the computing system. The instructions also cause the at least one processing unit to execute the set of instructions specified in the determined routine definition.

In some embodiments, the instructions may further cause the at least one processing unit to use a machine learning model to predict a value based on the received change associated with the parameter and adjust the set of instructions based on the value. Executing the set of instructions may include executing the adjusted set of instructions. The computing system may be configured to generate log data. Observing the parameter associated with the computing system may include reading information from the log data.

In some embodiments, the parameter associated with the computing system may be an attribute. The change associated with the parameter may include selection of the attribute to be included in a form generated by the computing system. The parameter associated with the computing system may be utilization of a configuration parameter of the computing system. The change associated with the parameter may include a value for the configuration parameter passed a defined threshold value.

The following detailed description and accompanying drawings provide a better understanding of the nature and advantages of various embodiments of the present disclosure.

BRIEF DESCRIPTION OF THE DRAWINGS

FIG. 6 illustrates a graphical user interface (GUI) for creating a line item form according to some embodiments.

FIG. 8 illustrates a GUI for a line item form according to some embodiments.

DETAILED DESCRIPTION

In the following description, for purposes of explanation, numerous examples and specific details are set forth in order to provide a thorough understanding of the present disclosure. It will be evident, however, to one skilled in the art that various embodiment of the present disclosure as defined by the claims may include some or all of the features in these examples alone or in combination with other features described below, and may further include modifications and equivalents of the features and concepts described herein.

Described herein are techniques for dynamically generating logic for computing system. In some embodiments, a first computing system may include an application operating on the computing system. A second computing system can be configured to monitor a defined parameter associated with the first computing system. The second computing system may receive information contained in logs generated by the first computing system. When the second computing system receives a change associated with the parameter associated with the first computing system, the second computing system determines a routine definition associated with the parameter. Then, the second computing system executes a set of instructions specified in the routine definition.

The techniques described in the present application provide a number of benefits and advantages over conventional methods for generating logic for computing systems. For instance, using the techniques described in the present application allows logic to be dynamically generated and injected into the computing system without redeploying any software running on the computing system. Conventional methods may require the computing system to redeploy its software in order to include the logic in the computing system.

Figure 1:
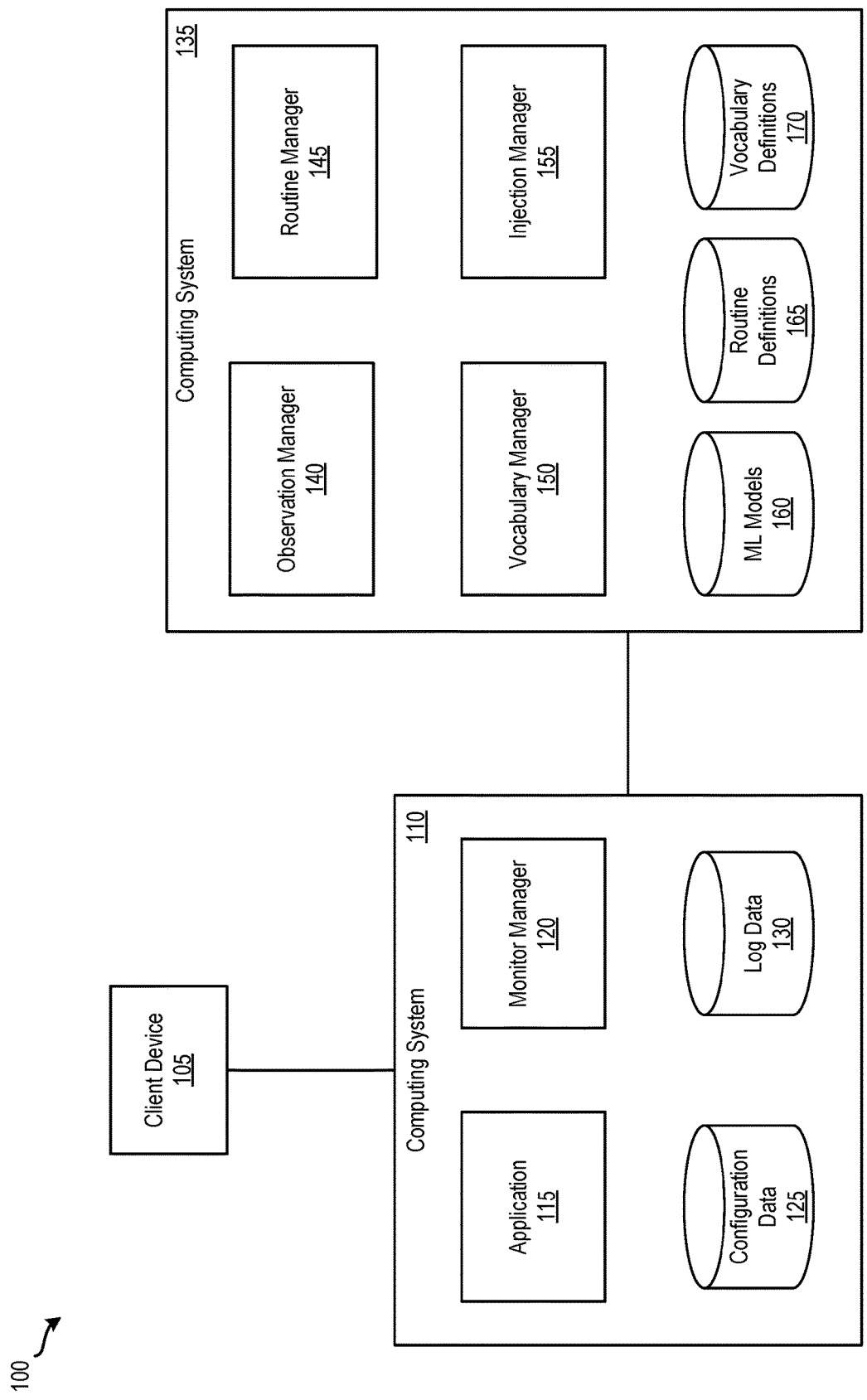
FIG. 1 illustrates a system for dynamically generating logic according to some embodiments.

FIG. 1 illustrates a system 100 for dynamically generating logic according to some embodiments. As shown, system 100 includes client device 105, computing system 110, and computing system 135. Client device 105 may communicate and interact with computing system 110. For instance, a user of client device 105 can access (e.g., via a graphical user interface (GUI) provided by computing system 110) computing system 110 (e.g., application 115) to set values for various configuration parameters and/or select certain parameters to be monitored or observed by computing system 135. While FIG. 1 shows one client device, one of ordinary skill in the art will appreciate that system 100 can include any number of additional client devices that are configured the same as or similar to client device 105.

As illustrated in FIG. 1, computing system 110 includes application 115, monitor manager 120, configuration data storage 125, and log data storage 130. Configuration data storage 125 is configured to store configuration data associated with computing system 110 (e.g., application 115). For example, configuration data storage 145 can store values of configuration parameters used to configure application 115. Log data storage 130 stores log data generated by computing system 110 (e.g., application 115). In some embodiments, storages 125 and 130 are implemented in a single physical storage while, in other embodiments, storages 125 and 130 may be implemented across several physical storages. While FIG. 1 shows storages 125 and 130 as part of computing system 110, one of ordinary skill in the art will appreciate that configuration data storage 125 and/or log data storage 130 may be external to computing system 110 in some embodiments.

Application 115 is a software application operating on computing system 110 based on configuration data stored in configuration data storage 125. For example, when application 115 starts up, application 115 can access configuration data storage 125 to retrieve settings (e.g., values) for configuration parameters associated with application 115. Application 115 operates based on these configuration parameter settings. While executing on computing system 110, application 115 may generate events that occur and store them in log data storage 130. In some cases, application 115 can receive values for configuration parameters from a user of client device 105 via a GUI provided by application 115. In response to receiving values for configuration parameters, application 115 stores them in configuration data storage 125. Application 115 can be any number of different applications. Examples of such application include a database application, a procurement application, a customer relationship management (CRM) application, an enterprise resource planning (ERP) application, a supply chain management (SCM) application, a human resource management (HRM) application, etc.

Monitor manager 120 is configured to monitor events that occur on computing system 110. For instance, when monitor manager 120 detects an event has occurred on computing system 110, monitor manager 120 generates log data that includes information about the event. Then, monitor manager 120 stores the log data in log data storage 130. For log data containing events associated with parameters selected to be observed by computing system 135, monitor manager 120 sends such log data to computing system 135 (e.g., observation manager 140). Monitor manager 120 may determine that log data containing events associated with parameters selected to be observed by computing system 135 based on configuration data stored in configuration data storage 125.

As shown in FIG. 1, computing system 135 includes observation manager 140, routine manager 145, vocabulary manager 150, injection manager 155, and storages 160-170. machine learning (ML) models storage 160 stores ML models. Routine definitions storage 165 is configured to store routine definitions. In some embodiments, a routine definition is associated with a particular parameter and includes a set of instructions. Vocabulary definitions storage 170 stores vocabulary definition. In some embodiments, a vocabulary definition is associated with a set of routine definitions and includes a set of strings (e.g., words). In some embodiments, storages 160-170 are implemented in a single physical storage while, in other embodiments, storages 160-170 may be implemented across several physical storages. While FIG. 1 shows storages 160-170 as part of computing system 110, one of ordinary skill in the art will appreciate that ML models storage 160, routine definitions storage 165, and/or vocabulary definitions storage 170 may be external to computing system 135 in some embodiments.

Observation manager 140 is responsible for observing parameters associated with computing system 110. For example, observation manager 140 can receive log data from computing system 110 (e.g., monitor manager 120). In response, observation manager 140 determines whether the event associated with a parameter that is included in the log data is a particular defined event associated with the parameter. If so, observation manager 140 sends routine manager 145 the parameter and a request to determine a routine definition associated with the parameter. In return, observation manager 140 receives a set of instructions from routine manager 145. In some instances, observation manager 140 may access ML models storage 160 to retrieve an ML model associated with the parameter. Next, observation manager 140 uses the ML model to predict a value. Observation manager 140 then adjusts the set of instructions received from routine manager 145 based on the value. Observation manager 140 sends injection manager 155 the set of instructions and a request to process the set of instructions.

Routine manager 145 is configured to determine routine definitions associated with parameters. For instance, routine manager 145 may receive from observation manager 140 a parameter and a request to determine a routine definition associated with the parameter. As mentioned above, a routine definition is associated with a particular parameter and includes a set of instructions in some embodiments. In response to the request, routine manager 145 accesses routine definitions storage 165 to retrieve a routine definition associated with the parameter. Then, routine manager 145 sends the set of instructions specified in the routine definition to observation manager 140. In some cases, routine manager 145 may determine whether the set of instructions specified in the routine definition are valid instructions. To make such a determination, routine manager 145 tokenizes the set of instructions into a set of tokens (e.g., words). Then, routine manager 145 sends vocabulary manager 150 a request for a set of vocabulary associated with the routine definition. In return, routine manager 145 receives the requested set of vocabulary from vocabulary manager 150. Next, routine manager 145 checks whether a token in the set of tokens is included in the set of vocabulary. If so, routine manager 145 determines that the set of instructions are valid instructions and sends observation manager 140 the set of instructions. Otherwise, routine manager 145 determines that the set of instructions are not valid instructions and sends observation manager 140 a notification indicating so.

Vocabulary manager 150 handles requests for sets of vocabularies associated with routine definitions. For example, vocabulary manager 150 can receive from routine manager 145 a request for a set of vocabulary associated with a routine definition. As explained above, in some embodiments, a vocabulary definition is associated with a set of routine definitions and includes a set of strings. In response, vocabulary manager 150 accesses vocabulary definitions storage 170 to retrieve a vocabulary definition associated with the routine definition. Next, vocabulary manager 150 sends the set of strings specified in the vocabulary definition to routine manager 145.

Injection manager 155 is configured to process sets of instructions. For instance, injection manager 155 may receive from observation manager 140 a set of instructions and a request to process the set of instructions. In response to the request, injection manager 155 processes the set of instructions by injecting the set of instructions in computing system 110. Injection manager 155 can use different techniques to inject instructions in computing system 110. For example, in some embodiments, injection manager 155 injects a set of instructions in computing system 110 by sending application 115 commands understandable by application 115. In other embodiments, injection manager 155 injects a set of instructions in computing system 110 by accessing a dynamic library associated with a program executing on computing system 110.

Figure 2:
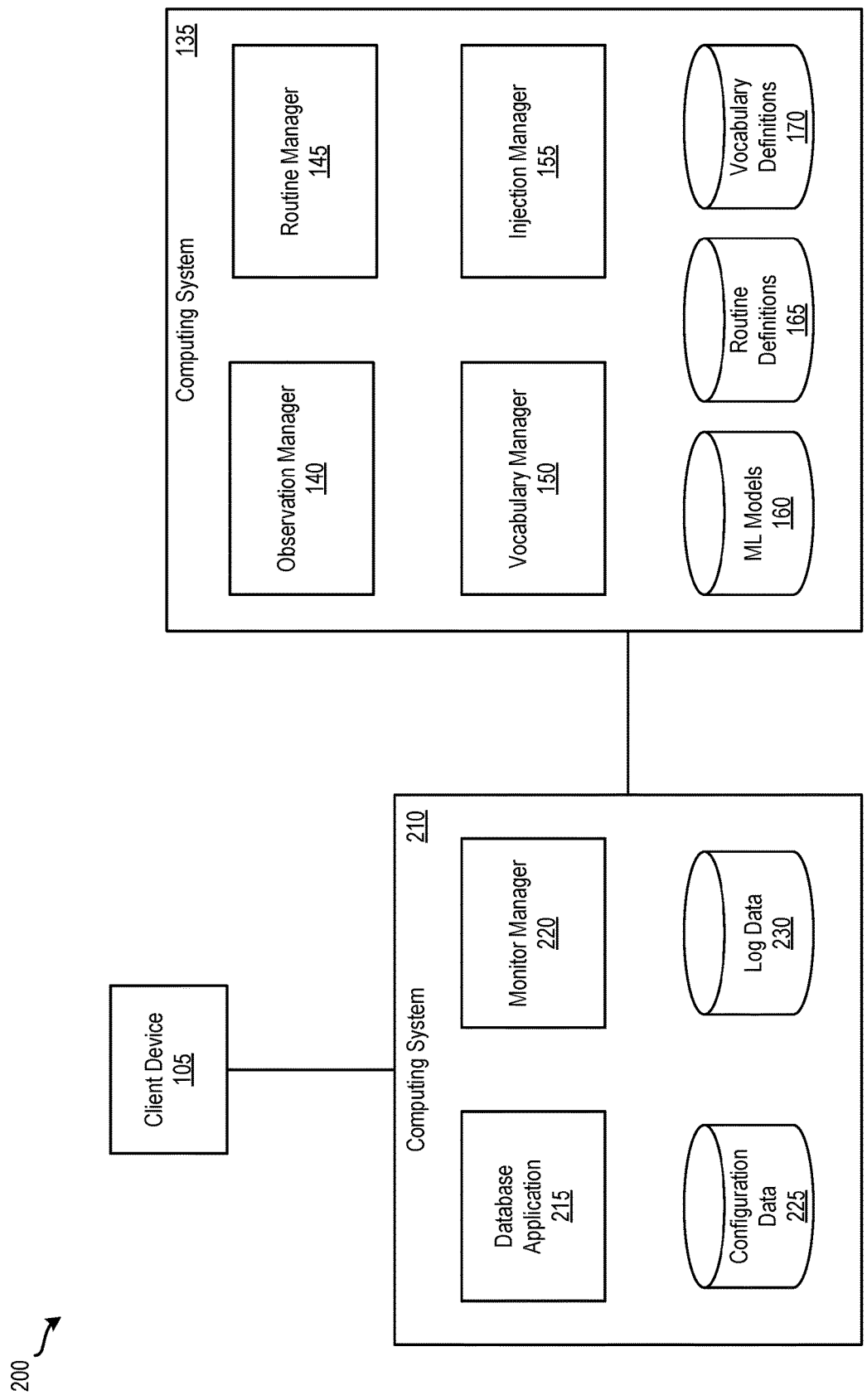
FIG. 2 illustrates a system for dynamically generating logic based on configuration parameters according to some embodiments.

Several example systems utilizing the techniques described above will now be described. FIG. 2 illustrates a system 200 for dynamically generating logic based on configuration parameters according to some embodiments. As depicted in FIG. 2, system 200 includes client device 105, computing system 210, and computing system 135. Computing system 210 includes database application 215, monitor manager 220, configuration data storage 225, and log data storage 230. Monitor manager 220, configuration data storage 225, and log data storage 230 may be implemented by monitor manager 120, configuration data storage 125, and log data storage 130, respectively. In particular, configuration data storage 125 can store configuration data associated with database application 215 such as, for example, values of configuration parameters used to configure database application 215. Log data storage 230 may store log data generated by database application 215.

Database application 215 is a software database application operating on computing system 210 based on configuration data stored in configuration data storage 225. For instance, when database application 215 starts up, database application 215 accesses configuration data storage 225 to retrieve settings (e.g., values) for configuration parameters associated with database application 215. Then, database application 215 begins operating based on the retrieved configuration parameter settings. For this example, one of the configuration parameters is the maximum number of connections that database application 215 supports. The setting for this configuration parameter in this example is 20. While executing on computing system 210, database application 215 generates events that occur and stores them in log data storage 230. In this example, database application 215 generates an event indicating that the number of connections being used with database application 215 has passed a defined threshold value (e.g., 16 connections, 17 connections, 18 connections, etc.) and is becoming close to reaching the maximum number of connections.

Monitor manager 220 monitors events that occur in database application 215. Once monitor manager 220 detects an event has occurred in database application 215, monitor manager 220 generates log data that includes information about the event. Monitor manager 220 then stores the log data in log data storage 230. Here, monitor manager 220 is configured to send any log data containing events associated with the maximum number of connections parameter. As such, when monitor manager 220 detects the event generated by database application 215 indicating that the number of connections being used with database application 215 has passed the defined threshold value, monitor manager 220 sends the log data to observation manager 140.

After observation manager 140 receives the log data from monitor manager 220, observation manager 140 determines whether the event associated with the maximum number of connections parameter included in the log data is a particular defined event associated with the parameter. Here, a defined event associated with the maximum number of connections parameter is the number of connections being used with database application 215 has passed the defined threshold value. Thus, observation manager 140 sends routine manager 145 the maximum number of connections parameter and a request to determine a routine definition associated with the parameter.

Figures 3, 4:
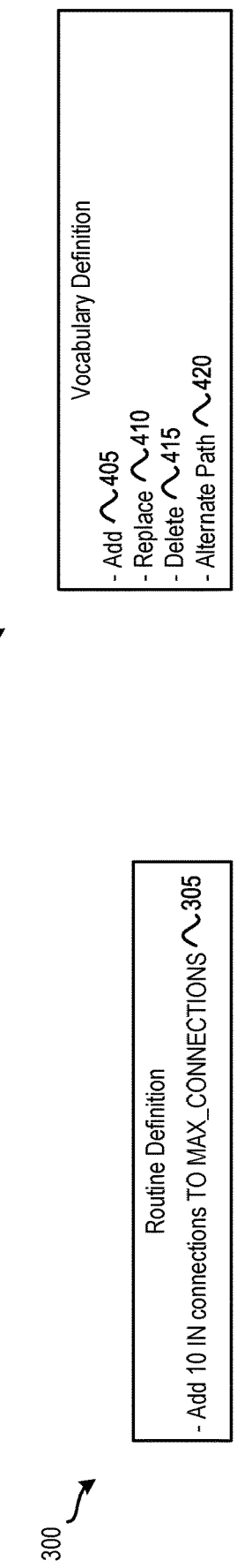
FIG. 3 illustrates an example routine definition according to some embodiments.
FIG. 4 illustrates an example vocabulary definition according to some embodiments.

Upon receiving the maximum number of connections parameter and the request to determine a routine definition associated with the parameter, routine manager 145 accesses routine definitions storage 165 to retrieve a routine definition associated with the parameter. FIG. 3 illustrates an example routine definition 300 according to some embodiments. Specifically, routine definition 300 is associated with the maximum number of connections parameter. Therefore, routine manager 145 retrieves routine definition 300 from routine definitions storage 165 in this example. As illustrated, routine definitions 300 includes a set of instructions 305, which reads "Add 10 IN connections TO MAX_CONNECTIONS," for dynamically adding 10 connections to the value for the maximum number of connections parameter. Here, routine manager 145 then determines whether the set of instructions specified in the routine definition are valid instructions by first tokenizing the set of instructions 305 into a set of tokens: "Add," "10," "IN," "connections," "TO," and "MAX_CONNECTIONS."

Returning to FIG. 2, routine manager 145 sends vocabulary manager 150 a request for a set of vocabulary associated with routine definition 300. When vocabulary manager 150 receives the request, vocabulary manager 150 accesses vocabulary definitions storage 170 to retrieve a vocabulary definition associated with routine definition 300. Next, vocabulary manager 150 sends the set of strings specified in the vocabulary definition to routine manager 145. FIG. 4 illustrates an example vocabulary definition 400 according to some embodiments. In particular, vocabulary manager 145 retrieves vocabulary definition 400 for this example. As depicted in FIG. 4, vocabulary definition 400 includes four strings 405-420. Hence, vocabulary manager 150 sends strings 405-420 to routine manager 145. Once routine manager 145 receives strings 405-420 from vocabulary manager 150, routine manager 145 checks whether the first token in the set of tokens is included in strings 405-420. Here, the first token "Add" matches string 405. Since, the first token is included in strings 405-420, routine manager 145 determines that set of instructions 305 are valid instructions. Accordingly, routine manager 145 sends observation manager 140 set of instructions 305.

Upon receiving set of instructions 305, observation manager 140 accesses ML models storage 160 to retrieve an ML model associated with the maximum number of connections parameter. Next, observation manager 140 uses the ML model to predict a value based on a history of events indicating that the number of connections being used with database application 215 has passed the defined threshold value. Based on the predicted value, observation manager 140 adjusts set of instructions 305 by increasing the value "10" by the predicted value. Then, observation manager 140 sends injection manager 155 the adjusted set of instructions 305 and a request to process the set of instructions. In response to the request, injection manager 155 processes the adjusted set of instructions 305 by injecting it in database application 215. In particular, injection manager 155 injects the adjusted set of instructions 305 in database application 215 by sending database application 215 a set of commands understandable by database application 215 to increase the value for the maximum number of connections parameter by the sum of 10 (i.e., the value specified in set of instructions 305) and the predicted value.

Figure 5:
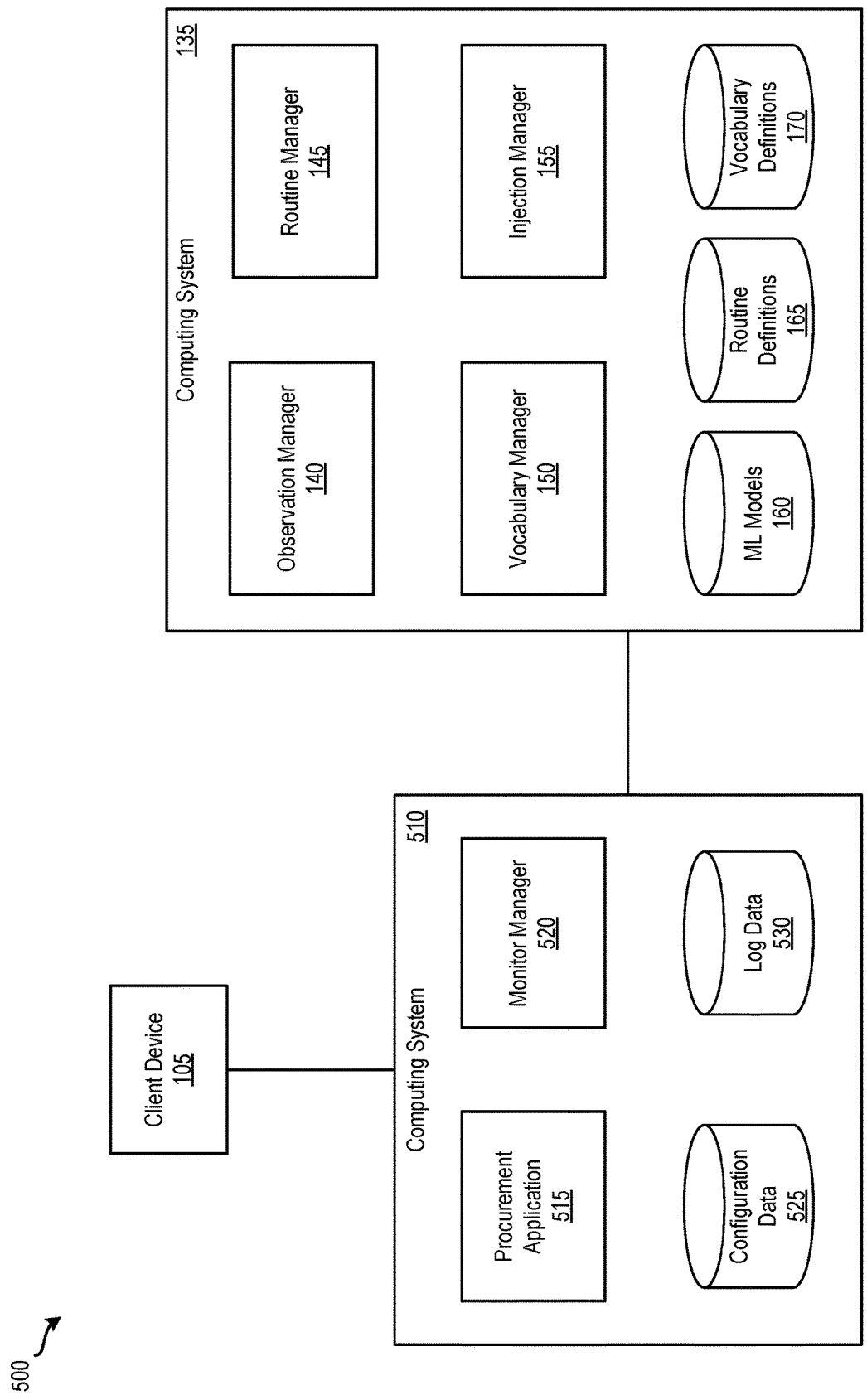
FIG. 5 illustrates a system for dynamically generating logic based on form attributes according to some embodiments.

FIG. 5 illustrates a system 500 for dynamically generating logic based on form attributes according to some embodiments. As illustrated, system 500 includes client device 105, computing system 510, and computing system 135. Computing system 510 includes procurement application 515, monitor manager 520, configuration data storage 525, and log data storage 530. Monitor manager 520, configuration data storage 525, and log data storage 530 can be implemented by monitor manager 120, configuration data storage 125, and log data storage 130, respectively. Specifically, configuration data storage 525 is configured to store configuration data associated with procurement application 515 such as, for example, values of configuration parameters used to configure procurement application 515. Log data storage 530 can store log data generated by procurement application 515.

Procurement application 515 is a software procurement application operating on computing system 510 based on configuration data stored in configuration data storage 525. For example, when procurement application 515 starts up, procurement application 515 accesses configuration data storage 525 to retrieve settings (e.g., values) for configuration parameters associated with procurement application 515. Next, procurement application 515 begins operating based on the retrieved configuration parameter settings. In this example, one of the configuration parameter is a price attribute. The setting for this configuration parameter in this example is the price attribute to be observable. While executing on computing system 510, procurement application 515 generates events that occur and stores them in log data storage 530. For this example, procurement application 515 generates an event indicating that a price attribute has been selected for a line item form.

FIG. 6 illustrates a GUI 600 for creating a line item form according to some embodiments. For this example, procurement application 515 provides GUI 600 to client device 105 and a user of client device 105 provides the input and selections described below. As shown, GUI 600 includes user interface (UI) controls 605-620 and selectable UI items 625-640. UI control 605 is configured to receive input for a name of an item, UI control 610 is configured to receive input for a description of the item, UI control 615 is configured to receive input for a set of commodities of which the item is comprised, and UI control 620 is configured to receive input for a currency. For this example, the item is for an exterior handle for a car door that is made up of 90% iron and 10% nickel. The currency is United States Dollar (USD). Each of the UI items 625-635, when selected, indicates that a corresponding line item attribute is to be included in the line item form. UI item 640, when selected, is for submitting a request to create the line item form. As depicted in FIG. 6, UI items 625 and 630 are selected, indicating that a price attribute and a quantity attribute be included in the line item form.

Returning to FIG. 5, monitor manager 520 monitors events that occur in procurement application 515. When monitor manager 520 detects an event has occurred in procurement application 515, monitor manager 520 generates log data that includes information about the event and stores the log data in log data storage 530. In this example, monitor manager 520 is configured to send any log data containing events associated with the selection of a price attribute for a form. Once monitor manager 520 detects the event generated by procurement application 515 indicating that a price attribute has been selected for a form, monitor manager 520 sends the log data to observation manager 140.

Upon receiving the log data from monitor manager 520, observation manager 140 determines whether the event associated with the price attribute parameter included in the log data is a particular defined event associated with the parameter. For this example, a defined event associated with the price attribute parameter is a price attribute has been selected for a form. As such, observation manager 140 sends routine manager 145 the price attribute parameter and a request to determine a routine definition associated with the parameter.

Figure 7:
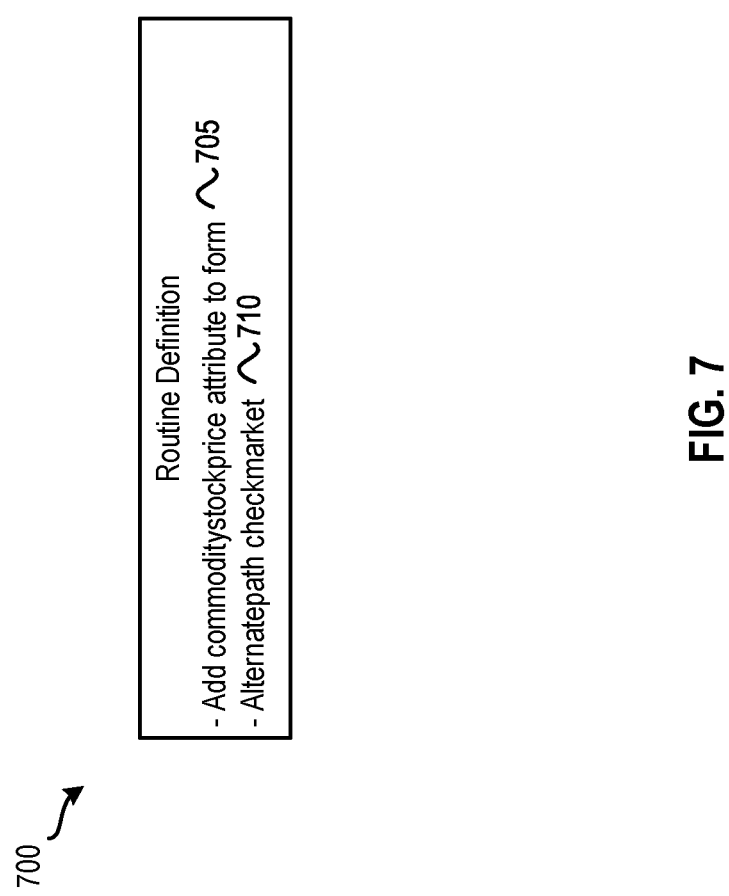
FIG. 7 illustrates another example routine definition according to some embodiments.

When routine manager 145 receives the price attribute parameter and the request to determine a routine definition associated with the parameter, routine manager 145 accesses routine definitions storage 165 to retrieve a routine definition associated with the parameter. In some cases, routine manager 145 may not find a routine definition that is associated with the parameter. In such cases, routine manager 145 sends observation manager 140 a notification indicating so. FIG. 7 illustrates another example routine definition 700 according to some embodiments. In particular, routine definition 700 is associated with the price attribute parameter. Accordingly, routine manager 145 retrieves routine definition 700 from routine definitions storage 165 for this example. As shown, routine definitions 700 includes a set of instructions 705 and set of instructions 710. Set of instructions 705 is for dynamically adding an attribute to a form. Set of instructions 710 is for dynamically modifying a path for a form.

Returning to FIG. 5, routine manager 145 sends observation manager 140 sets of instructions 705 and 710. In some cases, observation manager 140 can receive from routine manager 145 a notification indicating that routine manager 145 could not find a routine definition associated with the parameter. In some such cases, observation manager 140 accesses ML models storage 160 to retrieve an ML model associated with the parameter. In some embodiments, such an ML model is configured to predict a set of instructions based on a given parameter. For example, if the given parameter is an extended price attribute, the ML model may predict a set of instructions that includes instructions 705 and 710 since the extended price attribute is similar to the price attribute. Then, observation manager 140 sends injection manager 155 the sets of instructions 705 and 710 (or the set of instructions predicted by the ML model described in cases where a routine definition associated with the parameter does not exist) and a request to process the set of instructions. In response to the request, injection manager 155 processes the set of instructions 705 and 710 by injecting them in procurement application 515. Here, injection manager 155 injects the sets of instructions 705 and 710 in procurement application 515 by accessing a dynamic library associated with procurement application 515.

FIG. 8 illustrates a GUI 800 for a line item form according to some embodiments. In this example, a user of client device 105 selected UI item 740 in GUI 700. In response to receiving the selection, procurement application 515 provides GUI 800 to client device 105. As depicted in FIG. 8, GUI 800 includes UI controls 805, 810, and 825, attributes 815 and 820, and selectable UI item 830. UI control 805 is configured to receive input for a name of an item, UI control 810 is configured to receive input for a price of the item, and UI control 825 is configured to receive input for a quantity of the item. UI item 830, when selected, is for submitting a request to save the line item form. Here, set of instructions 705 injected by injection manager 115 into procurement application 515 caused attributes 815 and 820 to be included in the line item form. As shown, attribute 815 is a commodity stock price associated with iron and attribute 820 is a commodity stock price associated with nickel. Set of instructions 710 modified the path to which procurement application 515 transitions upon receiving a selection of UI item 830. Originally, procurement application 515 was configured to, upon receiving a selection of UI item 830, transition from displaying GUI 800 to displaying a page indicating that the line item form has been saved. Now, after injection manager 115 injected set of instructions 710 into procurement application 515, it caused procurement application 515 to, upon receiving a selection of UI item 830, to transition from displaying GUI 800 to displaying a GUI that includes stock market information associated with iron and nickel commodities.

Figure 9:
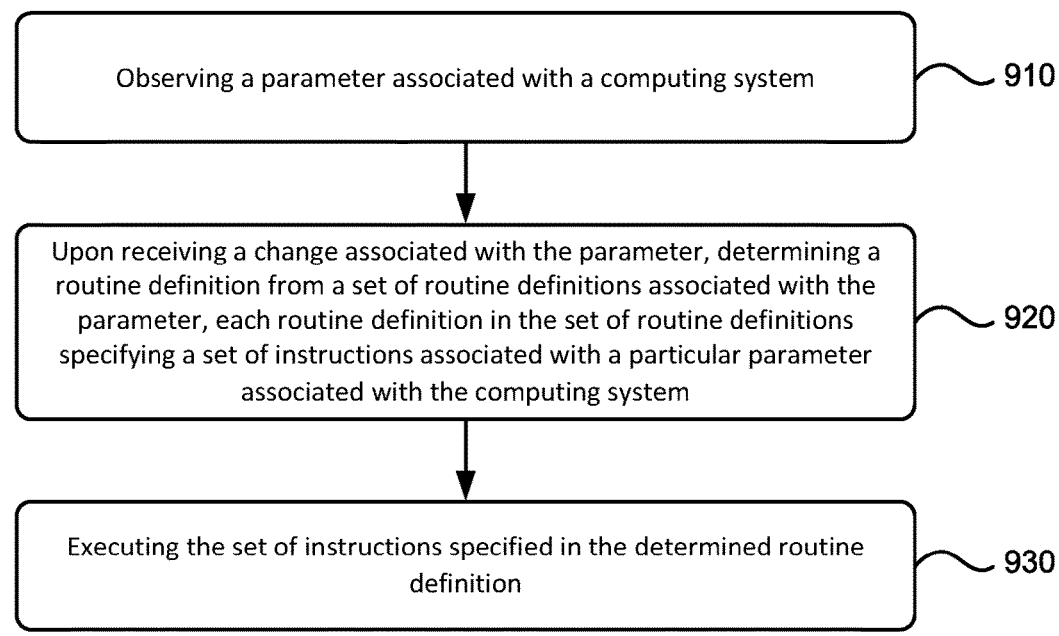
FIG. 9 illustrates a process for dynamically generating logic according to some embodiments.

FIG. 9 illustrates a process 900 for dynamically generating logic according to some embodiments. In some embodiments, computing system 135 performs process 900. Process 900 starts by observing, at 910, a parameter associated with a computing system. Referring to FIG. 2 as an example, observation manager 140 may observe the maximum number of connections parameter associated with computing system 210 via log data received from monitor manager 220.

Next, upon receiving a change associated with the parameter, process 900 determines, at 920, a routine definition from a set of routine definitions associated with the parameter, each routine definition in the set of routine definitions specifying a set of instructions associated with a particular parameter associated with the computing system. Referring to FIGS. 2 and 3 as an example, routine manager 145 can determine routine definition 300 from a set of routine definitions since routine definition 300 is associated with the maximum number of connections parameter.

Finally, process 900 executes, at 930, the set of instructions specified in the determined routine definition. Referring to FIG. 2 as an example, injection manager 155 may execute the set of instructions 305 by injecting it in database application 215 (e.g., sending database application 215 a set of commands understandable by database application 215 to increase the value for the maximum number of connections parameter).

Figure 10:
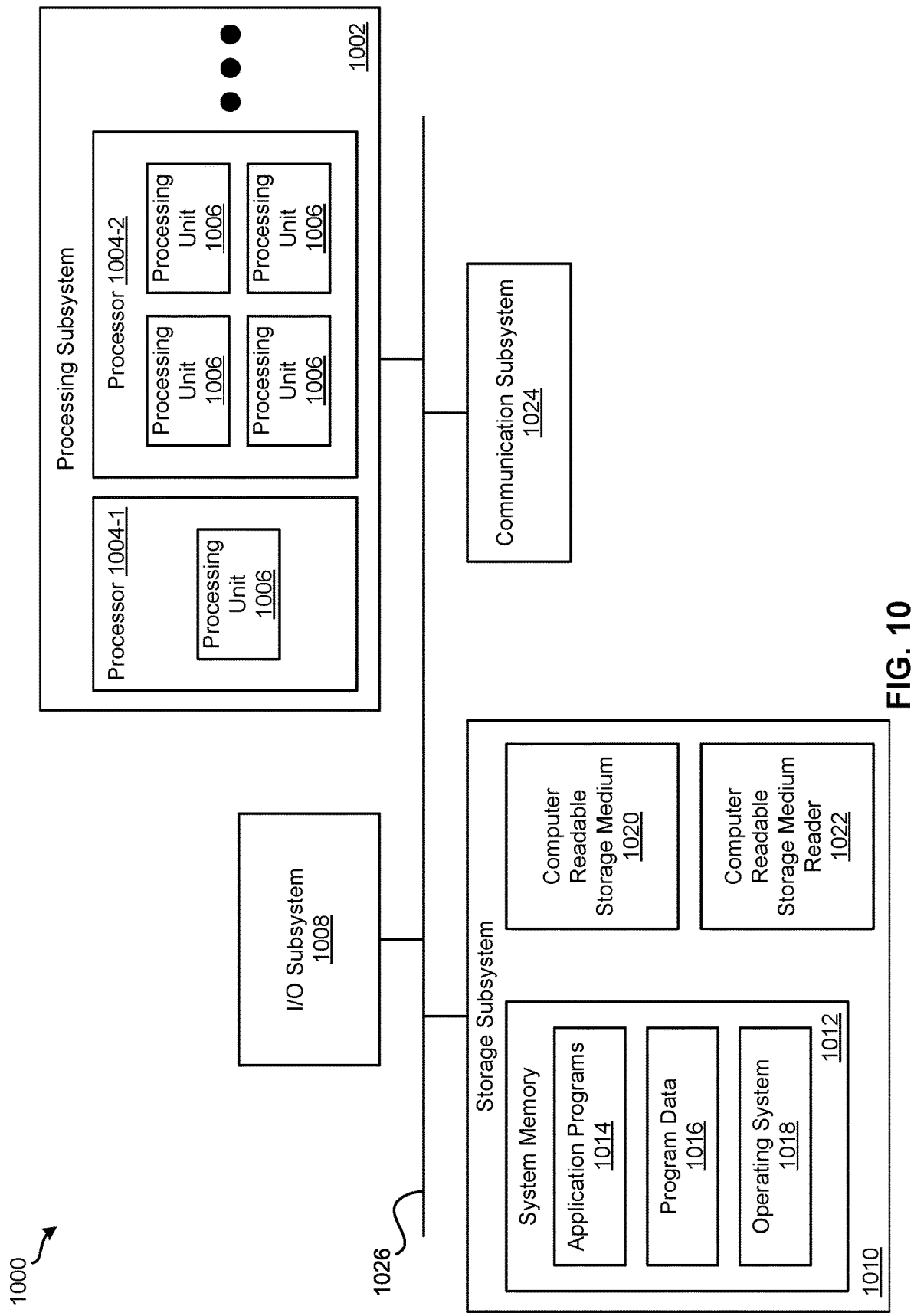
FIG. 10 illustrates an exemplary computer system, in which various embodiments may be implemented.

FIG. 10 illustrates an exemplary computer system 1000 for implementing various embodiments described above. For example, computer system 1000 may be used to implement client device 105, computing system 110, computing system 135, computing system 210, and computing system 510. Computer system 1000 may be a desktop computer, a laptop, a server computer, or any other type of computer system or combination thereof. Some or all elements of application 115, monitor manager 120, observation manager 140, routine manager 145, vocabulary manager 150, injection manager 155, database application 215, monitor manager 220, procurement application 515, monitor manager 520, or combinations thereof can be included or implemented in computer system 1000. In addition, computer system 1000 can implement many of the operations, methods, and/or processes described above (e.g., process 900). As shown in FIG. 10, computer system 1000 includes processing subsystem 1002, which communicates, via bus subsystem 1026, with input/output (I/O) subsystem 1008, storage subsystem 1010 and communication subsystem 1024.

Bus subsystem 1026 is configured to facilitate communication among the various components and subsystems of computer system 1000. While bus subsystem 1026 is illustrated in FIG. 10 as a single bus, one of ordinary skill in the art will understand that bus subsystem 1026 may be implemented as multiple buses. Bus subsystem 1026 may be any of several types of bus structures (e.g., a memory bus or memory controller, a peripheral bus, a local bus, etc.) using any of a variety of bus architectures. Examples of bus architectures may include an Industry Standard Architecture (ISA) bus, a Micro Channel Architecture (MCA) bus, an Enhanced ISA (EISA) bus, a Video Electronics Standards Association (VESA) local bus, a Peripheral Component Interconnect (PCI) bus, a Universal Serial Bus (USB), etc.

Processing subsystem 1002, which can be implemented as one or more integrated circuits (e.g., a conventional microprocessor or microcontroller), controls the operation of computer system 1000. Processing subsystem 1002 may include one or more processors 1004. Each processor 1004 may include one processing unit 1006 (e.g., a single core processor such as processor 1004-1) or several processing units 1006 (e.g., a multicore processor such as processor 1004-2). In some embodiments, processors 1004 of processing subsystem 1002 may be implemented as independent processors while, in other embodiments, processors 1004 of processing subsystem 1002 may be implemented as multiple processors integrate into a single chip or multiple chips. Still, in some embodiments, processors 1004 of processing subsystem 1002 may be implemented as a combination of independent processors and multiple processors integrated into a single chip or multiple chips.

In some embodiments, processing subsystem 1002 can execute a variety of programs or processes in response to program code and can maintain multiple concurrently executing programs or processes. At any given time, some or all of the program code to be executed can reside in processing subsystem 1002 and/or in storage subsystem 1010. Through suitable programming, processing subsystem 1002 can provide various functionalities, such as the functionalities described above by reference to process 900.

I/O subsystem 1008 may include any number of user interface input devices and/or user interface output devices. User interface input devices may include a keyboard, pointing devices (e.g., a mouse, a trackball, etc.), a touchpad, a touch screen incorporated into a display, a scroll wheel, a click wheel, a dial, a button, a switch, a keypad, audio input devices with voice recognition systems, microphones, image/video capture devices (e.g., webcams, image scanners, barcode readers, etc.), motion sensing devices, gesture recognition devices, eye gesture (e.g., blinking) recognition devices, biometric input devices, and/or any other types of input devices.

User interface output devices may include visual output devices (e.g., a display subsystem, indicator lights, etc.), audio output devices (e.g., speakers, headphones, etc.), etc. Examples of a display subsystem may include a cathode ray tube (CRT), a flat-panel device (e.g., a liquid crystal display (LCD), a plasma display, etc.), a projection device, a touch screen, and/or any other types of devices and mechanisms for outputting information from computer system 1000 to a user or another device (e.g., a printer).

As illustrated in FIG. 10, storage subsystem 1010 includes system memory 1012, computer-readable storage medium 1020, and computer-readable storage medium reader 1022. System memory 1012 may be configured to store software in the form of program instructions that are loadable and executable by processing subsystem 1002 as well as data generated during the execution of program instructions. In some embodiments, system memory 1012 may include volatile memory (e.g., random access memory (RAM)) and/or non-volatile memory (e.g., read-only memory (ROM), programmable read-only memory (PROM), erasable programmable read-only memory (EPROM), electrically erasable programmable read-only memory (EEPROM), flash memory, etc.). System memory 1012 may include different types of memory, such as static random access memory (SRAM) and/or dynamic random access memory (DRAM). System memory 1012 may include a basic input/output system (BIOS), in some embodiments, that is configured to store basic routines to facilitate transferring information between elements within computer system 1000 (e.g., during start-up). Such a BIOS may be stored in ROM (e.g., a ROM chip), flash memory, or any other type of memory that may be configured to store the BIOS.

As shown in FIG. 10, system memory 1012 includes application programs 1014 (e.g., application 115), program data 1016, and operating system (OS) 1018. OS 1018 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Computer-readable storage medium 1020 may be a non-transitory computer-readable medium configured to store software (e.g., programs, code modules, data constructs, instructions, etc.). Many of the components (e.g., application 115, monitor manager 120, observation manager 140, routine manager 145, vocabulary manager 150, injection manager 155, database application 215, monitor manager 220, procurement application 515, and monitor manager 520) and/or processes (e.g., process 900) described above may be implemented as software that when executed by a processor or processing unit (e.g., a processor or processing unit of processing subsystem 1002) performs the operations of such components and/or processes. Storage subsystem 1010 may also store data used for, or generated during, the execution of the software.

Storage subsystem 1010 may also include computer-readable storage medium reader 1022 that is configured to communicate with computer-readable storage medium 1020. Together and, optionally, in combination with system memory 1012, computer-readable storage medium 1020 may comprehensively represent remote, local, fixed, and/or removable storage devices plus storage media for temporarily and/or more permanently containing, storing, transmitting, and retrieving computer-readable information.

Computer-readable storage medium 1020 may be any appropriate media known or used in the art, including storage media such as volatile, non-volatile, removable, non-removable media implemented in any method or technology for storage and/or transmission of information. Examples of such storage media includes RAM, ROM, EEPROM, flash memory or other memory technology, compact disc read-only memory (CD-ROM), digital versatile disk (DVD), Blu-ray Disc (BD), magnetic cassettes, magnetic tape, magnetic disk storage (e.g., hard disk drives), Zip drives, solid-state drives (SSD), flash memory card (e.g., secure digital (SD) cards, CompactFlash cards, etc.), USB flash drives, or any other type of computer-readable storage media or device.

Communication subsystem 1024 serves as an interface for receiving data from, and transmitting data to, other devices, computer systems, and networks. For example, communication subsystem 1024 may allow computer system 1000 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication subsystem 1024 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication subsystem 1024 may provide components configured for wired communication (e.g., Ethernet) in addition to or instead of components configured for wireless communication.

One of ordinary skill in the art will realize that the architecture shown in FIG. 10 is only an example architecture of computer system 1000, and that computer system 1000 may have additional or fewer components than shown, or a different configuration of components. The various components shown in FIG. 10 may be implemented in hardware, software, firmware or any combination thereof, including one or more signal processing and/or application specific integrated circuits.

Figure 11:
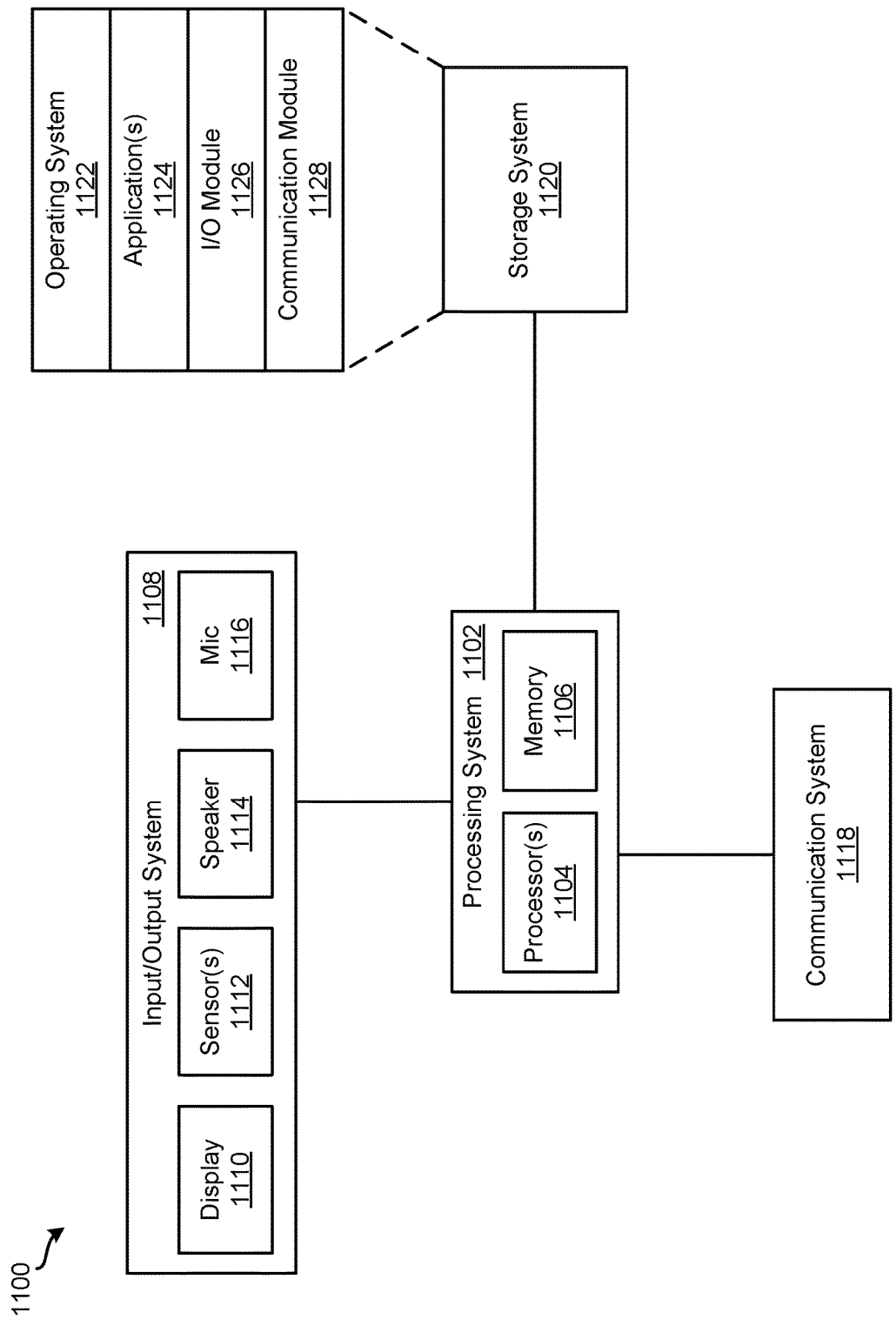
FIG. 11 illustrates an exemplary computing device, in which various embodiments may be implemented.

FIG. 11 illustrates an exemplary computing device 1100 for implementing various embodiments described above. For example, computing device 1100 may be used to implement client device 105. Computing device 1100 may be a cellphone, a smartphone, a wearable device, an activity tracker or manager, a tablet, a personal digital assistant (PDA), a media player, or any other type of mobile computing device or combination thereof. As shown in FIG. 11, computing device 1100 includes processing system 1102, input/output (I/O) system 1108, communication system 1118, and storage system 1120. These components may be coupled by one or more communication buses or signal lines.

Processing system 1102, which can be implemented as one or more integrated circuits (e.g., a conventional microprocessor or microcontroller), controls the operation of computing device 1100. As shown, processing system 1102 includes one or more processors 1104 and memory 1106. Processors 1104 are configured to run or execute various software and/or sets of instructions stored in memory 1106 to perform various functions for computing device 1100 and to process data.

Each processor of processors 1104 may include one processing unit (e.g., a single core processor) or several processing units (e.g., a multicore processor). In some embodiments, processors 1104 of processing system 1102 may be implemented as independent processors while, in other embodiments, processors 1104 of processing system 1102 may be implemented as multiple processors integrate into a single chip. Still, in some embodiments, processors 1104 of processing system 1102 may be implemented as a combination of independent processors and multiple processors integrated into a single chip.

Memory 1106 may be configured to receive and store software (e.g., operating system 1122, applications 1124, I/O module 1126, communication module 1128, etc. from storage system 1120) in the form of program instructions that are loadable and executable by processors 1104 as well as data generated during the execution of program instructions. In some embodiments, memory 1106 may include volatile memory (e.g., random access memory (RAM)), non-volatile memory (e.g., read-only memory (ROM), programmable read-only memory (PROM), erasable programmable read-only memory (EPROM), electrically erasable programmable read-only memory (EEPROM), flash memory, etc.), or a combination thereof.

I/O system 1108 is responsible for receiving input through various components and providing output through various components. As shown for this example, I/O system 1108 includes display 1110, one or more sensors 1112, speaker 1114, and microphone 1116. Display 1110 is configured to output visual information (e.g., a graphical user interface (GUI) generated and/or rendered by processors 1104). In some embodiments, display 1110 is a touch screen that is configured to also receive touch-based input. Display 1110 may be implemented using liquid crystal display (LCD) technology, light-emitting diode (LED) technology, organic LED (OLED) technology, organic electro luminescence (OEL) technology, or any other type of display technologies. Sensors 1112 may include any number of different types of sensors for measuring a physical quantity (e.g., temperature, force, pressure, acceleration, orientation, light, radiation, etc.). Speaker 1114 is configured to output audio information and microphone 1116 is configured to receive audio input. One of ordinary skill in the art will appreciate that I/O system 1108 may include any number of additional, fewer, and/or different components. For instance, I/O system 1108 may include a keypad or keyboard for receiving input, a port for transmitting data, receiving data and/or power, and/or communicating with another device or component, an image capture component for capturing photos and/or videos, etc.

Communication system 1118 serves as an interface for receiving data from, and transmitting data to, other devices, computer systems, and networks. For example, communication system 1118 may allow computing device 1100 to connect to one or more devices via a network (e.g., a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.). Communication system 1118 can include any number of different communication components. Examples of such components may include radio frequency (RF) transceiver components for accessing wireless voice and/or data networks (e.g., using cellular technologies such as 2G, 3G, 4G, 5G, etc., wireless data technologies such as Wi-Fi, Bluetooth, ZigBee, etc., or any combination thereof), global positioning system (GPS) receiver components, and/or other components. In some embodiments, communication system 1118 may provide components configured for wired communication (e.g., Ethernet) in addition to or instead of components configured for wireless communication.

Storage system 1120 handles the storage and management of data for computing device 1100. Storage system 1120 may be implemented by one or more non-transitory machine-readable mediums that are configured to store software (e.g., programs, code modules, data constructs, instructions, etc.) and store data used for, or generated during, the execution of the software.

In this example, storage system 1120 includes operating system 1122, one or more applications 1124, I/O module 1126, and communication module 1128. Operating system 1122 includes various procedures, sets of instructions, software components and/or drivers for controlling and managing general system tasks (e.g., memory management, storage device control, power management, etc.) and facilitates communication between various hardware and software components. Operating system 1122 may be one of various versions of Microsoft Windows, Apple Mac OS, Apple OS X, Apple macOS, and/or Linux operating systems, a variety of commercially-available UNIX or UNIX-like operating systems (including without limitation the variety of GNU/ Linux operating systems, the Google Chrome® OS, and the like) and/or mobile operating systems such as Apple iOS, Windows Phone, Windows Mobile, Android, BlackBerry OS, Blackberry 10, and Palm OS, WebOS operating systems.

Applications 1124 can include any number of different applications installed on computing device 1100. Examples of such applications may include a browser application, an address book application, a contact list application, an email application, an instant messaging application, a word processing application, JAVA-enabled applications, an encryption application, a digital rights management application, a voice recognition application, location determination application, a mapping application, a music player application, etc.

I/O module 1126 manages information received via input components (e.g., display 1110, sensors 1112, and microphone 1116) and information to be outputted via output components (e.g., display 1110 and speaker 1114). Communication module 1128 facilitates communication with other devices via communication system 1118 and includes various software components for handling data received from communication system 1118.

One of ordinary skill in the art will realize that the architecture shown in FIG. 11 is only an example architecture of computing device 1100, and that computing device 1100 may have additional or fewer components than shown, or a different configuration of components. The various components shown in FIG. 11 may be implemented in hardware, software, firmware or any combination thereof, including one or more signal processing and/or application specific integrated circuits.

Figure 12:
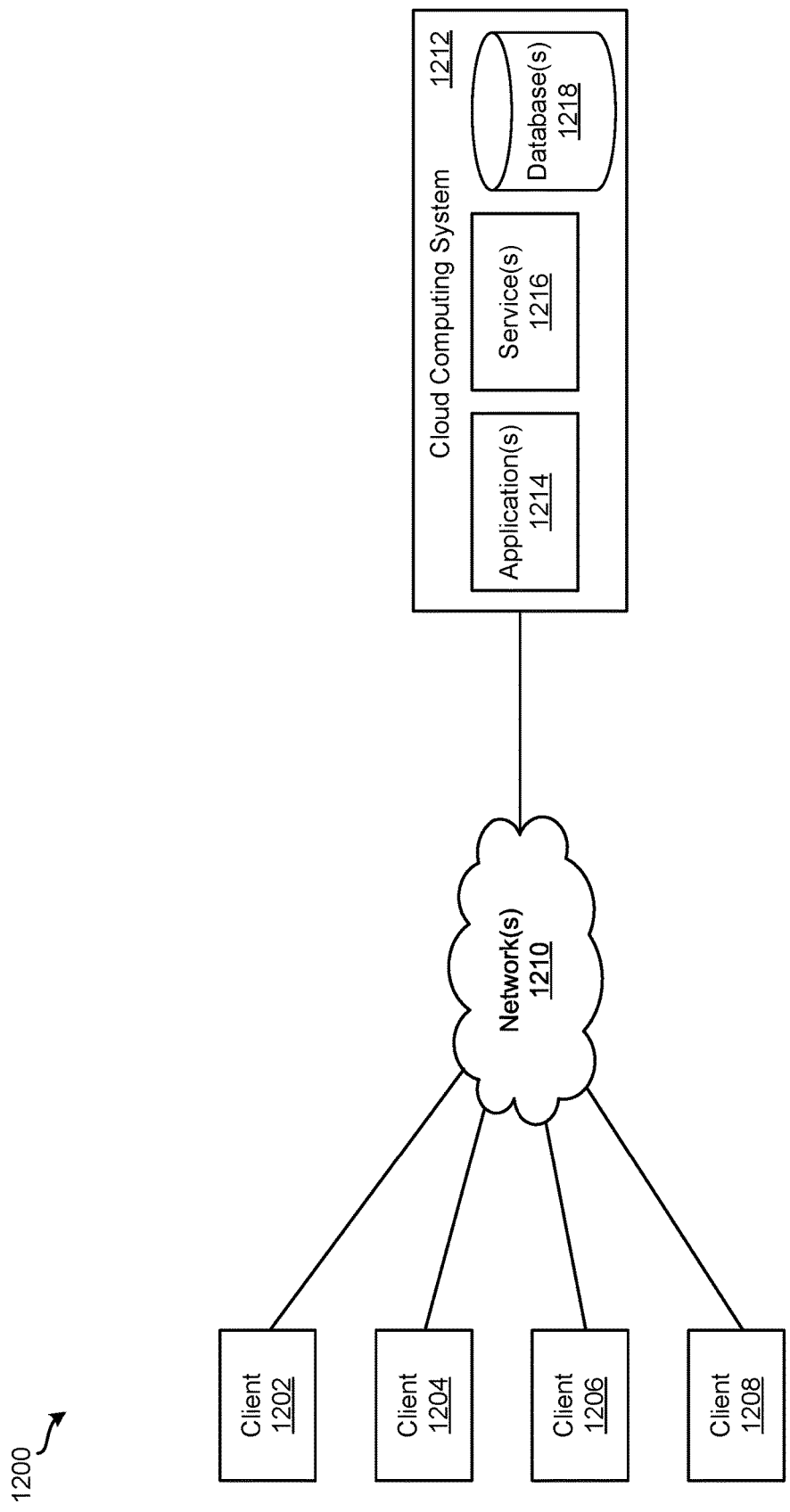
FIG. 12 illustrates an exemplary system, in which various embodiments may be implemented.

FIG. 12 illustrates an exemplary system 1200 for implementing various embodiments described above. For example, one of the client devices 1202-1208 may be used to implement client device 105 and cloud computing system may be used to implement computing system 110, computing system 135, computing system 210, and computing system 510. As shown, system 1200 includes client devices 1202-1208, one or more networks 1210, and cloud computing system 1212. Cloud computing system 1212 is configured to provide resources and data to client devices 1202-1208 via networks 1210. In some embodiments, cloud computing system 1200 provides resources to any number of different users (e.g., customers, tenants, organizations, etc.). Cloud computing system 1212 may be implemented by one or more computer systems (e.g., servers), virtual machines operating on a computer system, or a combination thereof.

As shown, cloud computing system 1212 includes one or more applications 1214, one or more services 1216, and one or more databases 1218. Cloud computing system 1200 may provide applications 1214, services 1216, and databases 1218 to any number of different customers in a self-service, subscription-based, elastically scalable, reliable, highly available, and secure manner.

In some embodiments, cloud computing system 1200 may be adapted to automatically provision, manage, and track a customer's subscriptions to services offered by cloud computing system 1200. Cloud computing system 1200 may provide cloud services via different deployment models. For example, cloud services may be provided under a public cloud model in which cloud computing system 1200 is owned by an organization selling cloud services and the cloud services are made available to the general public or different industry enterprises. As another example, cloud services may be provided under a private cloud model in which cloud computing system 1200 is operated solely for a single organization and may provide cloud services for one or more entities within the organization. The cloud services may also be provided under a community cloud model in which cloud computing system 1200 and the cloud services provided by cloud computing system 1200 are shared by several organizations in a related community. The cloud services may also be provided under a hybrid cloud model, which is a combination of two or more of the aforementioned different models.

In some instances, any one of applications 1214, services 1216, and databases 1218 made available to client devices 1202-1208 via networks 1210 from cloud computing system 1212 is referred to as a "cloud service." Typically, servers and systems that make up cloud computing system 1212 are different from the on-premises servers and systems of a customer. For example, cloud computing system 1212 may host an application and a user of one of client devices 1202-1208 may order and use the application via networks 1210.

Applications 1214 may include software applications that are configured to execute on cloud computing system 1212 (e.g., a computer system or a virtual machine operating on a computer system) and be accessed, controlled, managed, etc. via client devices 1202-1208. In some embodiments, applications 1214 may include server applications and/or mid-tier applications (e.g., HTTP (hypertext transport protocol) server applications, FTP (file transfer protocol) server applications, CGI (common gateway interface) server applications, JAVA server applications, etc.). Services 1216 are software components, modules, application, etc. that are configured to execute on cloud computing system 1212 and provide functionalities to client devices 1202-1208 via networks 1210. Services 1216 may be web-based services or on-demand cloud services.

Databases 1218 are configured to store and/or manage data that is accessed by applications 1214, services 1216, and/or client devices 1202-1208. For instance, storages 145-160 may be stored in databases 1218. Databases 1218 may reside on a non-transitory storage medium local to (and/or resident in) cloud computing system 1212, in a storage-area network (SAN), on a non-transitory storage medium local located remotely from cloud computing system 1212. In some embodiments, databases 1218 may include relational databases that are managed by a relational database management system (RDBMS). Databases 1218 may be a column-oriented databases, row-oriented databases, or a combination thereof. In some embodiments, some or all of databases 1218 are in-memory databases. That is, in some such embodiments, data for databases 1218 are stored and managed in memory (e.g., random access memory (RAM)).

Client devices 1202-1208 are configured to execute and operate a client application (e.g., a web browser, a proprietary client application, etc.) that communicates with applications 1214, services 1216, and/or databases 1218 via networks 1210. This way, client devices 1202-1208 may access the various functionalities provided by applications 1214, services 1216, and databases 1218 while applications 1214, services 1216, and databases 1218 are operating (e.g., hosted) on cloud computing system 1200. Client devices 1202-1208 may be computer system 1000 or computing device 1100, as described above by reference to FIGS. 10 and 11, respectively. Although system 1200 is shown with four client devices, any number of client devices may be supported.

Networks 1210 may be any type of network configured to facilitate data communications among client devices 1202-1208 and cloud computing system 1212 using any of a variety of network protocols. Networks 1210 may be a personal area network (PAN), a local area network (LAN), a storage area network (SAN), a campus area network (CAN), a metropolitan area network (MAN), a wide area network (WAN), a global area network (GAN), an intranet, the Internet, a network of any number of different types of networks, etc.

The above description illustrates various embodiments of the present disclosure along with examples of how aspects of the present disclosure may be implemented. The above examples and embodiments should not be deemed to be the only embodiments, and are presented to illustrate the flexibility and advantages of various embodiments of the present disclosure as defined by the following claims. Based on the above disclosure and the following claims, other arrangements, embodiments, implementations and equivalents will be evident to those skilled in the art and may be employed without departing from the spirit and scope of the present disclosure as defined by the claims.

What is claimed is:

1. A non-transitory machine-readable medium storing a program executable by at least one processing unit of a device, the program comprising sets of instructions for:
observing a parameter associated with a computing system;
upon receiving a change associated with the parameter, determining a routine definition from a set of routine definitions associated with the parameter, each routine definition in the set of routine definitions specifying a set of instructions associated with a particular parameter associated with the computing system; and
executing the set of instructions specified in the determined routine definition.

2. The non-transitory machine-readable medium of claim 1, wherein the program further comprises a set of instructions for:
using a machine learning model to predict a value based on the received change associated with the parameter; and
adjusting the set of instructions based on the value.

3. The non-transitory machine-readable medium of claim 2, wherein executing the set of instructions comprises executing the adjusted set of instructions.

4. The non-transitory machine-readable medium of claim 1, wherein the computing system is configured to generate log data, wherein observing the parameter associated with the computing system comprises reading information from the log data.

5. The non-transitory machine-readable medium of claim 1, wherein the parameter associated with the computing system is an attribute, wherein the change associated with the parameter comprises selection of the attribute to be included in a form generated by the computing system.

6. The non-transitory machine-readable medium of claim 1, wherein the parameter associated with the computing system is utilization of a configuration parameter of the computing system, wherein the change associated with the parameter comprises a value for the configuration parameter passed a defined threshold value.

7. The non-transitory machine-readable medium of claim 1, wherein the program further comprises a set of instructions for determining whether the set of instructions specified in the determined routing definition are valid by parsing the set of instructions into a set of tokens and determining that a particular token in the set of tokens matches a word in a set of defined valid words.

8. A method, executable by a device, comprising:
observing a parameter associated with a computing system;
upon receiving a change associated with the parameter, determining a routine definition from a set of routine definitions associated with the parameter, each routine definition in the set of routine definitions specifying a set of instructions associated with a particular parameter associated with the computing system; and
executing the set of instructions specified in the determined routine definition.

9. The method of claim 8 further comprising:
using a machine learning model to predict a value based on the received change associated with the parameter; and
adjusting the set of instructions based on the value.

10. The method of claim 9, wherein executing the set of instructions comprises executing the adjusted set of instructions.

11. The method of claim 8, wherein the computing system is configured to generate log data, wherein observing the parameter associated with the computing system comprises reading information from the log data.

12. The method of claim 8, wherein the parameter associated with the computing system is an attribute, wherein the change associated with the parameter comprises selection of the attribute to be included in a form generated by the computing system.

13. The method of claim 8, wherein the parameter associated with the computing system is utilization of a configuration parameter of the computing system, wherein the change associated with the parameter comprises a value for the configuration parameter passed a defined threshold value.

14. The method of claim 8, wherein the program further comprises a set of instructions for determining whether the set of instructions specified in the determined routing definition are valid by parsing the set of instructions into a set of tokens and determining that a particular token in the set of tokens matches a word in a set of defined valid words.

15. A system comprising:
a set of processing units; and
a non-transitory machine-readable medium storing instructions that when executed by at least one processing unit in the set of processing units cause the at least one processing unit to:
observe a parameter associated with a computing system;
upon receiving a change associated with the parameter, determine a routine definition from a set of routine definitions associated with the parameter, each routine definition in the set of routine definitions specifying a set of instructions associated with a particular parameter associated with the computing system; and
execute the set of instructions specified in the determined routine definition.

16. The system of claim 15, wherein the instructions further cause the at least one processing unit to:
use a machine learning model to predict a value based on the received change associated with the parameter; and
adjust the set of instructions based on the value.

17. The system of claim 16, wherein executing the set of instructions comprises executing the adjusted set of instructions.

18. The system of claim 15, wherein the computing system is configured to generate log data, wherein observing the parameter associated with the computing system comprises reading information from the log data.

19. The system of claim 15, wherein the parameter associated with the computing system is an attribute, wherein the change associated with the parameter comprises selection of the attribute to be included in a form generated by the computing system.

20. The system of claim 15, wherein the parameter associated with the computing system is utilization of a configuration parameter of the computing system, wherein the change associated with the parameter comprises a value for the configuration parameter passed a defined threshold value.

\* \* \* \* \*